US010333357B1

(12) United States Patent
Abu Qahouq

(10) Patent No.: US 10,333,357 B1
(45) Date of Patent: Jun. 25, 2019

(54) METHODS AND SYSTEMS FOR ARRANGEMENT AND CONTROL OF WIRELESS POWER TRANSFER AND RECEIVING

(71) Applicant: Jaber Abu Qahouq, Tuscaloosa, AL (US)

(72) Inventor: Jaber Abu Qahouq, Tuscaloosa, AL (US)

( * ) Notice: Subject to any disclaimer, the term of this patent is extended or adjusted under 35 U.S.C. 154(b) by 233 days.

(21) Appl. No.: 15/236,476

(22) Filed: Aug. 14, 2016

Related U.S. Application Data

(60) Provisional application No. 62/205,713, filed on Aug. 15, 2015.

(51) Int. Cl.
*H02J 1/10* (2006.01)
*H02J 50/40* (2016.01)
*H02J 50/60* (2016.01)
*H02J 50/80* (2016.01)

(52) U.S. Cl.
CPC .............. *H02J 50/40* (2016.02); *H02J 50/60* (2016.02); *H02J 50/80* (2016.02)

(58) Field of Classification Search
None
See application file for complete search history.

(56) References Cited

U.S. PATENT DOCUMENTS

2012/0013198 A1* 1/2012 Uramoto ................. H02J 5/005 307/104
2012/0139358 A1* 6/2012 Teggatz .................. H01F 38/14 307/104
2012/0217818 A1* 8/2012 Yerazunis .............. H02J 5/005 307/104
2012/0248890 A1* 10/2012 Fukushima ............ H02J 5/005 307/104
2013/0260676 A1* 10/2013 Singh .................. H04B 5/0037 455/41.1
2014/0232201 A1* 8/2014 Staring .................. H02J 5/005 307/104

(Continued)

*Primary Examiner* — Alfonso Perez Borroto
*Assistant Examiner* — Esayas G Yeshaw

(57) ABSTRACT

Systems and methods for transmitting, receiving, and controlling wireless power are disclosed. The systems include one or more transmitters, one or more receivers, one or more sensors, one or more surrounding mapping devices, one or more controllers and control methods, and/or one or several arrangements. In one embodiment, a system and controller automatically adjusts the wireless power amount/level and/or type/source based on the mapped surroundings in order maintain safety, maintain health, optimize efficiency, and/or improve wireless energy transmission and receiving. In another embodiment, a system and controller controls and adjust several types and forms wireless energy transmission and receiving such as radiative electromagnetic energy, non-radiative electromagnetic energy, sound waves energy, ultrasound energy, light energy, radio frequency energy, and/or inductively coupled energy. In another embodiment, the system parts such as transmitters and wireless energy/power receiving derives communicate information such as the type and amount of wireless energy being transmitted and received.

20 Claims, 13 Drawing Sheets

Wireless Power/Energy transmitter/Receiver
Sensor for Distance, Object Type Identification, and/or surroundings mapping device
Sensor for Distance, Object Type Identification, and/or surroundings mapping device
Wireless Power/ Energy Receiver
Wireless Power/ Energy Transmitter
Sensor for Distance, Object Type Identification, and/or surroundings mapping device
Wireless Power/Energy transmitter/Receiver
Wireless Power/Energy transmitter/Receiver

(56) References Cited

U.S. PATENT DOCUMENTS

2014/0320090 A1* 10/2014 Keeling .............. B60L 11/1829 320/162
2014/0375137 A1* 12/2014 Ichikawa ............. H04B 5/0037 307/104
2016/0141882 A1* 5/2016 Ichikawa ................ H02J 17/00 307/104
2016/0181818 A1* 6/2016 Joye ........................ H02J 5/005 307/104
2016/0190872 A1* 6/2016 Bohn ...................... H02J 7/025 307/104

* cited by examiner

METHODS AND SYSTEMS FOR ARRANGEMENT AND CONTROL OF WIRELESS POWER TRANSFER AND RECEIVING

CROSS-REFERENCE TO RELATED APPLICATIONS

This application claims the benefit of U.S. Provisional Patent Application No. 62/205,713, filed on Aug. 15, 2016, entitled "METHODS AND SYSTEMS FOR ARRANGEMENT AND CONTROL OF WIRELESS POWER TRANSFER AND RECEIVING," the disclosure of which is expressly incorporated herein by reference in its entirety.

BACKGROUND

There are several means in which power can be transmitted wirelessly to devices and received wirelessly by devices. Among these methods are Inductive, Resonance Inductive, and Radio Frequency, invented first by Tesla. Other methods include ultrasound, thermal, and light/laser, among others.

There is a desire to transfer and receive power wirelessly for longer distance and/or with higher efficiency while meeting safety standards and regulations. Embodiments of the disclosed systems and methods deal with these topics.

SUMMARY

Systems and methods for transmitting, receiving, and controlling wireless power are disclosed. The systems include one or more transmitters, one or more receivers, one or more sensors, one or more surrounding mapping devices, one or more controllers and control methods, and/or one or several arrangements. In one embodiment, a system and controller automatically adjusts the wireless power amount/level and/or type/source based on the mapped surroundings in order maintain safety, maintain health, optimize efficiency, and/or improve wireless energy transmission and receiving. In another embodiment, a system and controller controls and adjust several types and forms wireless energy transmission and receiving such as radiative electromagnetic energy, non-radiative electromagnetic energy, sound waves energy, ultrasound energy, light energy, radio frequency energy, and/or inductively coupled energy. In another embodiment, the system parts such as transmitters and wireless energy/power receiving derives communicate information such as the type and amount of wireless energy being transmitted and received.

DESCRIPTION

The invention includes several parts in which all of them or part of them can be used in a wireless power or energy system. They can be used individually or together. The following is a description of the claimed invention parts. The description focuses on the new main aspects of the invention without detailing the known technologies and methods that are referred to which a skilled person in the art should know how they operate (e.gs. Radio Frequency waves and related energy, Induction and related energy, Resonance, sound waves and energy, Ultrasound Waves and related energy, camera, light and laser and related energy).

Figure 1:
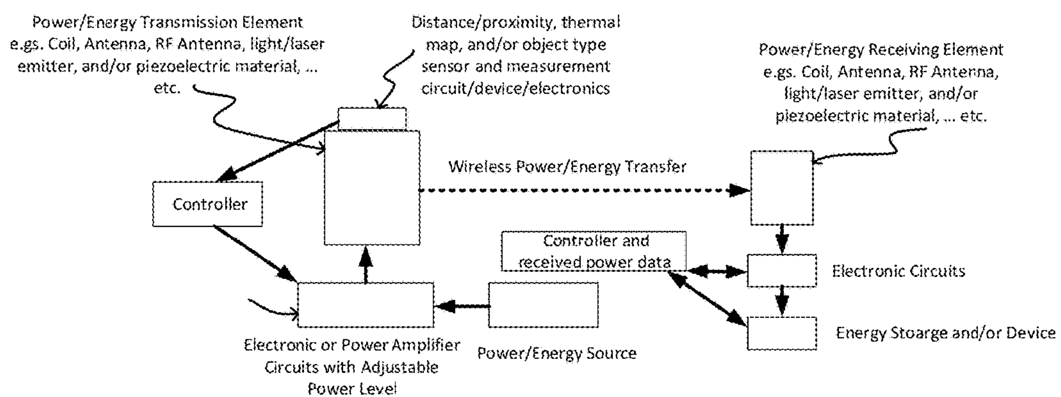
FIG. 1 illustrates an exemplary claimed wireless power system which includes a power transmitter with a coil, antenna, and/or other transmitting object such as RF antenna, inductive coils, resonance structure, piezoelectric element, sound transmitting element, and/or light source.

A wireless power system as shown in FIG. 1 has a wireless power or energy transmitter with a coil, antenna, and/or other transmitting object such as RF antenna, inductive coils, resonance structure, piezoelectric element (e.g. for ultrasound transmission), and/or light source. For simplicity, it will be referred to any of these by "transmitting element." The transmitting element wirelessly transmits the energy provided from one or more electric/electronic circuit or power electronic circuit such as a power amplifier. A person or another object has a device to receive power. The power could also be received by a wireless power receiver station and retransmitted again.

The transmitting element might transmit energy in any wireless form such as radiative electromagnetic energy, non-radiative electromagnetic energy, sound waves energy, ultrasound energy, light energy, radio frequency energy, inductively coupled energy, thermal energy and/or other form of energy. The receiving element might receive energy in any wireless form such as radiative electromagnetic energy, non-radiative electromagnetic energy, sound waves energy, ultrasound energy, light energy, radio frequency energy, inductively coupled energy, thermal energy and/or other form of energy.

A claimed part of invention is related to FIG. 1 which is a controller that provides control signals to adaptively adjust the amount of power the power amplifier (or power supplying circuit) supplies to the transmitting element based on the location or how close a person is to the transmitting (and/or receiving) element. This might be needed in order to meet exposure energy amount limits based on safety (health) regulations (other example reasons in order to meet health/medical and/or regulation/governmental/standards requirements and/or in order to meet user defined requirements). For example, the power is adaptively increased when the person receiving power moves far away from the transmitter and the power is adaptively decreased as the person moves closer to the transmitter.

It is also claimed that the controller of the transmitter adaptively determine the amount of power based on measurement obtained from a system that senses distance and/or senses object type and/or need for energy/power. For example, an ultrasound sensor, infrared sensor, and/or camera system could be used to measure distance (and/or object type, size, nature) from the transmitters and/or receivers. The adaptive system adjust power/energy flow between the transmitter(s) and receiver(s) based on these measurements such as distance, object type (e.g. human or animal), object size, and/or surrounding area layout and content. Another example is a pyroelectric sensor is used to determine if the object is human and how far it is from the transmitter (and/or receiver). A third example is that the sensor could be a camera type sensor with low or high resolution. The wireless power transmitting system can also use the sensed information to switch between different wireless power/energy types (or the amount for each energy type that is transmitted) such as radiative electromagnetic energy, non-radiative electromagnetic energy, sound waves energy, ultrasound energy, light energy, radio frequency energy, inductively coupled energy, thermal energy and/or other form of energy.

It is also claimed that the wireless power receiver controller measures the amount of power received and provides a warning to the user if the received power exceeded certain limit thresholds. It is claimed that the receiver communicates with the transmitter the received power/energy information in order for the transmitter to adjust its power level.

It is claimed that the wireless power transmitter can adaptively adjust its transmitter power by several means such as (1) controlling the power/energy provided from the electronic circuit or power amplifier, (2) controlling (or reconfiguring) the gain or structure of the transmitting (and/or receiving) element(s), (3) switching between different transmitting (and or receiving) elements or turning ON and OFF different elements, (4) dividing the power between different transmitting (and/or receiving) elements and elements types that could be oriented to different directions with certain ratio, and/or (5) dividing the power with certain ratio between several types of wireless power/energy types such as radiative electromagnetic energy, non-radiative electromagnetic energy, sound waves energy, ultrasound energy, light energy, radio frequency energy, inductively coupled energy, thermal energy and/or other form of energy.

Figure 2:
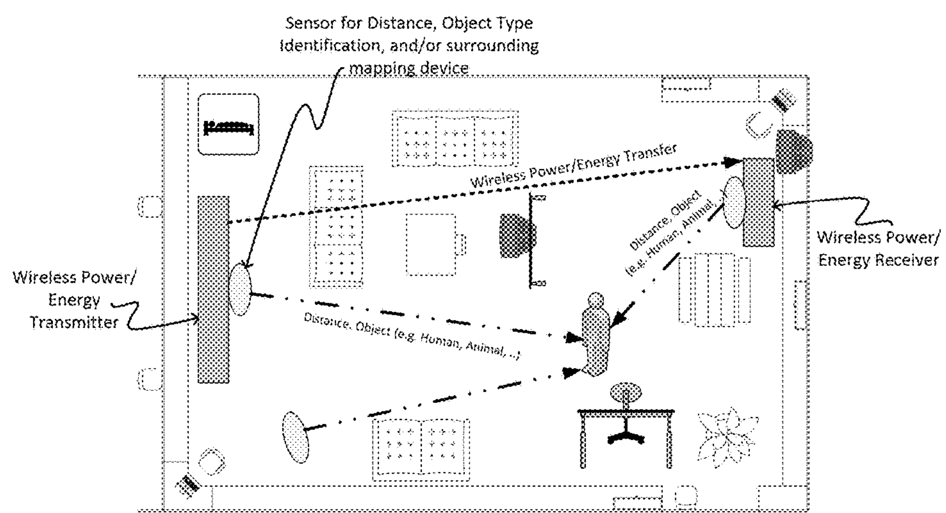
FIG. 2 illustrates an exemplary arrangement in a room or area/space where the claimed system and controller and system are used.
Figure 3:
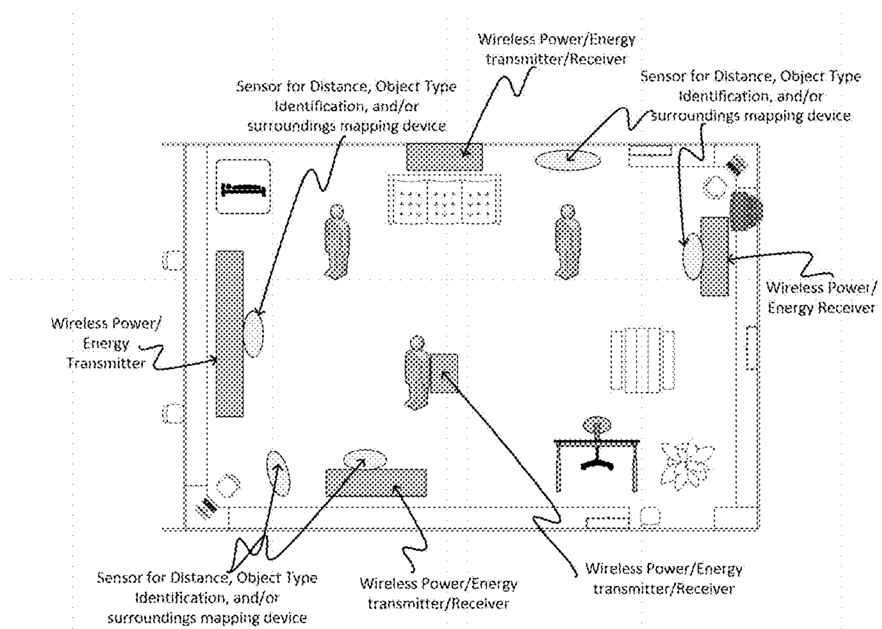
FIG. 3 illustrates a first exemplary system that is with partially similar scenario to FIG. 2 but with multiple humans (or objects in general) and multiple transmitters and receivers in addition to multiple sensors.
Figure 4:
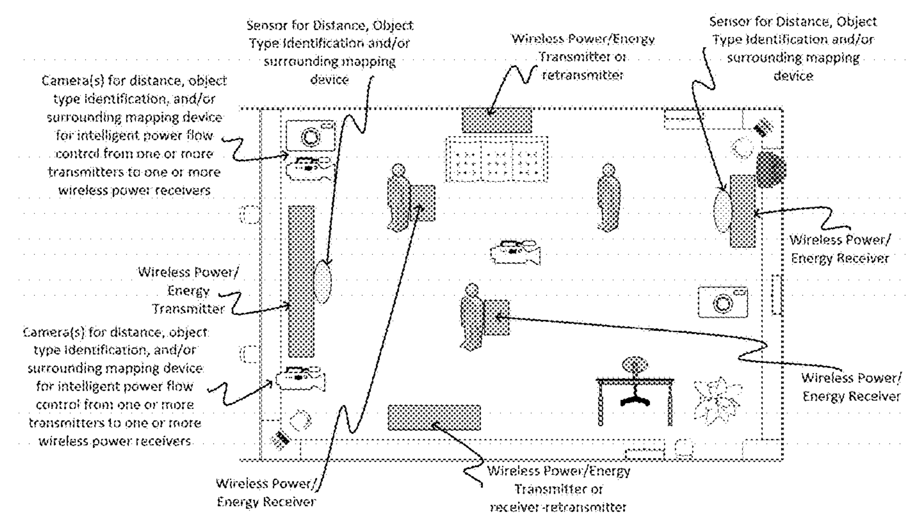
FIG. 4 illustrates an exemplary system and scenario where the claimed system and controller are utilizing camera (system or vision system in general) with one or more photo cameras and/or thermal cameras/sensors for surrounding mapping and control of wireless energy/power system.

FIG. 2 through FIG. 4 provide additional example diagrams to illustrate a claimed system and controller. In FIG. 2 illustrate a room or area/space where the claimed system and controller described earlier is used. The room includes the claimed wireless power/energy transmitter(s) sending energy to receiver(s) to power one or more devices or store energy. There is one or more sensor to measure the distance/location and/or size or a human from the transmitters and/or receivers and based on this information the transmitted power/energy level (strength/magnitude) and/or type of energy (e.g.s. inductive, ultrasound, RF, . . . among others) is adaptively adjusted for reasons such as maintaining safety (health/exposure limits) and/or to maintain given desired received power level. FIG. 3 shows partially similar scenario but with multiple humans (or objects in general) and multiple transmitters and receivers in addition to multiple sensors. The receivers (and/or transmitters) are nearby the humans in the room/space and/or can be carried by the humans. The claimed system and controller perform the same functions claimed earlier such as to maintain healthy exposure to energy and/or desired power level. FIG. 4 shows an example scenario where the claimed system and controller is utilizing camera (system or vision system in general) with one or more photo cameras and/or thermal cameras/sensors to map more intelligently the location of the humans and other objects and the locations of the transmitters and receivers and the location of other objects such as furniture and walls and use this information to adaptively and intelligently adjust and adapt the energy level and type from each transmitter and receiver to limit energy exposure (safety), achieve higher efficiency and longer transmission distance, and/or maintain desired energy levels for different receivers and at different locations in the room. In all of all of these scenarios that use the claimed system and controller, the controller can also use the sensed information to adjust the orientation and/or location of transmitter(s) and receiver(s) for reasons such as limit energy exposure, achieve higher efficiency and longer transmission distance, and/or maintain desired energy levels for different receivers and at different locations in the room. For example, the orientation can be adjusted by mechanical movement and/or by reconfiguring the design and connections to focus the energy in different directions. For another example, the location can be adjusted by robotic-type mechanical movements.

A device or more that measure energy/power exposure is claimed in this invention, which can be carried by the human/person/object or it can be part of the device receiving (or transmitting) wireless power/energy, which is used to control the wireless energy/power system parameters such as energy/power level/strength, type of wireless power/energy, device operation status, and/or transmitter(s) and/or receiver(s) orientation and/or frequency and/or configuration, among others.

Figure 5:
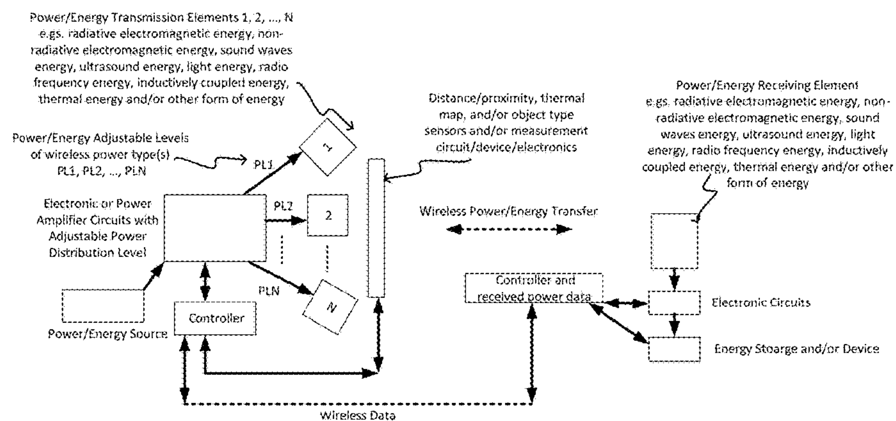
FIG. 5 illustrates an exemplary claimed system which has several transmitting antennas or transmitters (and/or receivers) in general of the same or different types, oriented to different directions or same direction and based on the sensed or received distance information of person(s), animal (s), bird(s), and/or any other object from the transmitter, the amount of power or energy shared by the antennas or transmitters in general is adjusted adaptively, for example in order to meet exposure/health or user requirements.

A system as illustrated in FIG. 5 is claimed which has several transmitting elements of the same or different types, oriented to different directions or same direction. Again, the word "transmitting elements" here is used to indicate a structure that is able to send power wirelessly such as one or more of the following: RF radiative antenna, inductive coils, resonance structure, piezoelectric element for ultrasound energy/power, and/or light source, thermal source, among others.

It is claimed that based on the sensed or received distance information of person(s), animal(s), bird(s), and/or any other object from the transmitter, the amount and type of wireless power or energy shared by the transmitting elements or transmitters in general is adjusted adaptively. This could be to maintain safety limits and/or to deliver different amount of power/energy to different receivers in different locations, among others (e.g. in order to meet health/medical and/or regulation/governmental/standards requirements and/or in order to meet user defined requirements). Some of these transmitting elements or wireless power/energy transmitters could be transmitting energy to one direction, more than one direction, or equally to all directions.

Figure 6:
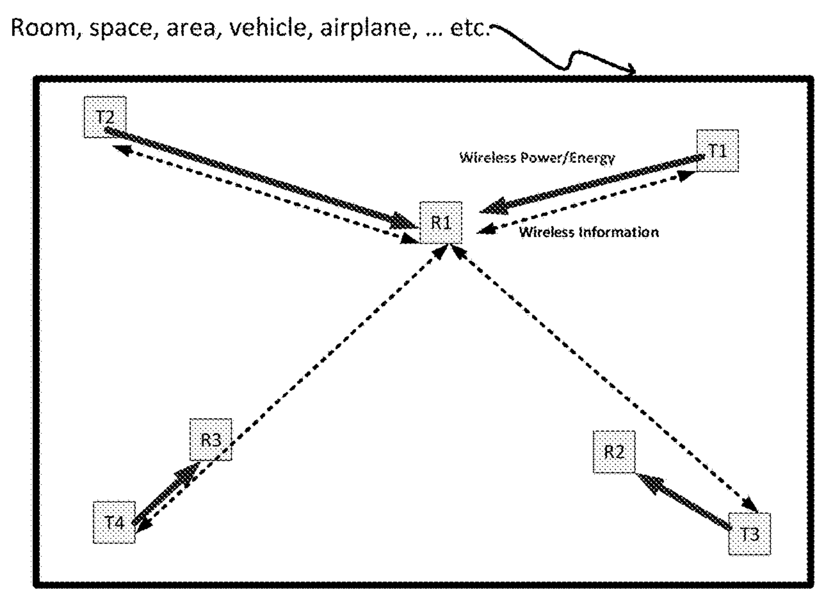
FIG. 6 illustrates an exemplary claimed system in a space or area such as a room, theater, shop, or vehicle, where several power transmitters are arranged in a certain manner in the space to provide better wireless power transmission coverage for maximized energy receiving based on the nature of the area and the dynamic objects in the area.

FIG. 6 shows a space or area such as a room, theater, shop, or vehicle. Several power transmitters are arranged in a certain manner in the space to provide better wireless power transmission coverage and control over the coverage.

It is claimed that as persons or devices move in such space, the transmitted power/energy from each transmitter is adjusted based on the persons location in the space/area. For example, as a person moves closer to transmitter 1 (T1) and far from transmitter 2, a controller increases the power transmitted by transmitter 2 (T2) and decreases the power transmitted by transmitter 1. It is also claimed that the orientation or the direction to which the transmitter sends powered toward can be adjusted based on the person(s) location in the space. The wireless power/energy each transmitter sent can be of the same type or different types of wireless energy. As described earlier, each transmitter (and/or receiver) can also have multiple types of transmitting (and/or receiving) elements that are able to transmit (and/or receive) different types of wireless energy. As the devices, objects, and persons move in the space, each transmitter (and/or receivers) can adjust what amount of energy to transmit (and/or receive) from each wireless energy type or form.

It is claimed that the amount of power transmitted by each transmitter is controlled such that the amount of energy received by the receiver or device is maximized. It is also claimed that this is done in a way to satisfy safety and regulation limits and/or guidelines and/or meet user defined limits/requirements. It is claimed that the receiver(s) communicate the amount of power/energy received and distance with the transmitters. It is also claimed that the transmitters communicate with each other, and so the receivers (R1, R2 . . . ).

For example, the claimed systems and controllers can deliver more wireless power/energy to a device when a person is not near or holding the device and reduce the amount of power/energy to a safe level when the person gets closer to the device or carries the device.

Figure 7:
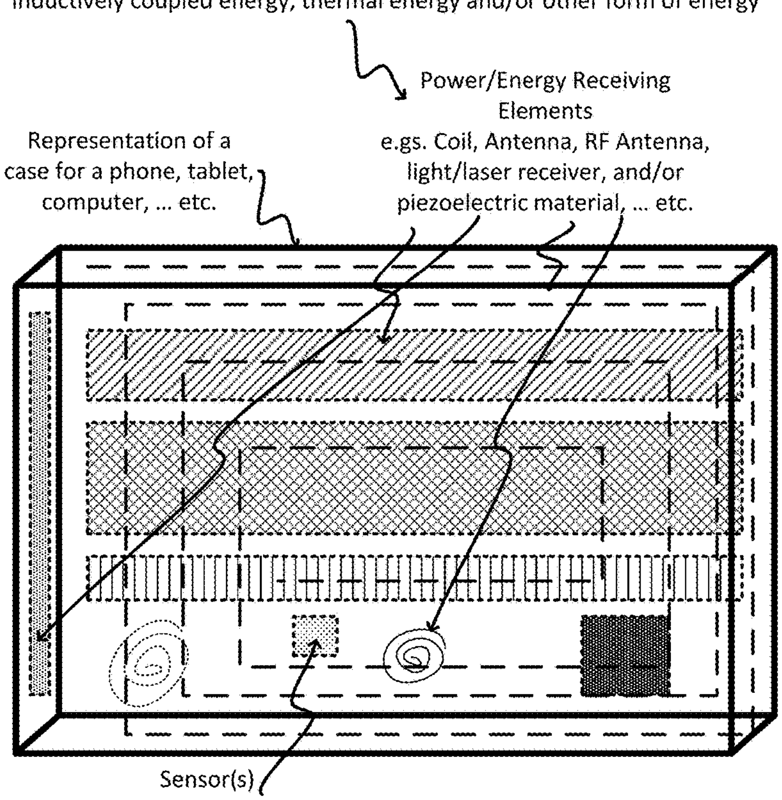
FIG. 7 illustrates an exemplary claimed a cell phone case (similarly a tablet case, a computer case . . . etc.) with one or several embedded antennas and/or wireless power/energy receiver/transmitter elements and/or possible exposure sensors.
Figure 8:
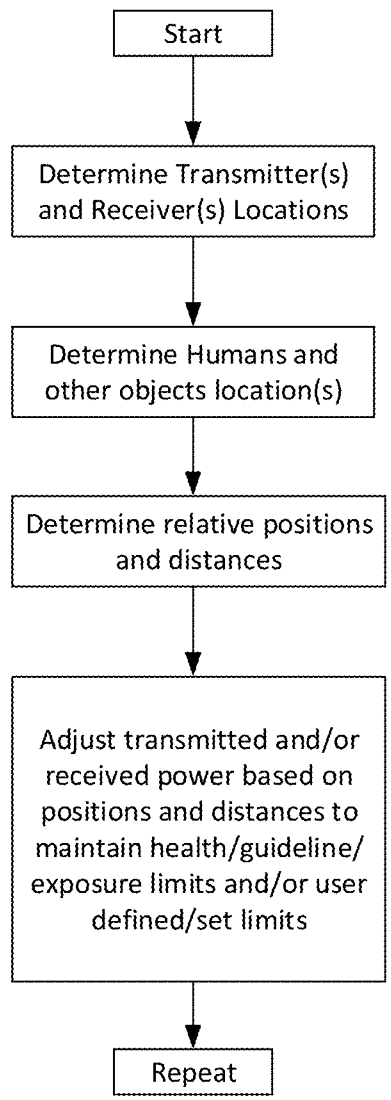
FIG. 8 illustrates an exemplary claimed system and controller operation flowchart.
Figure 9:
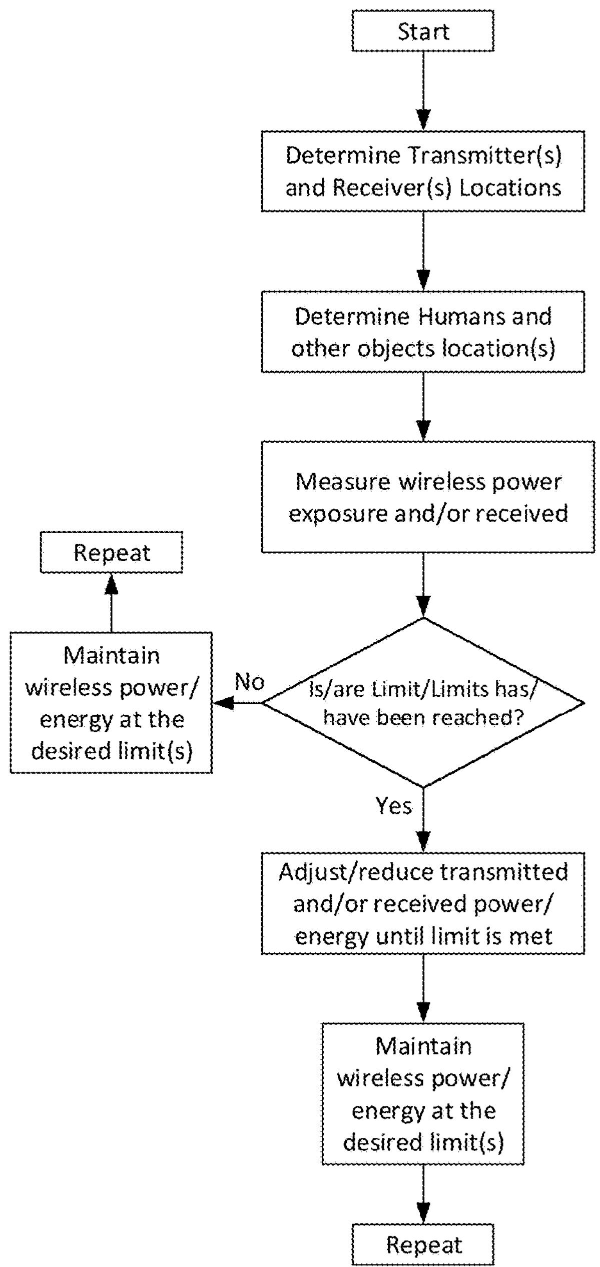
FIG. 9 illustrates an exemplary claimed system and controller operation flowchart.
Figure 10:
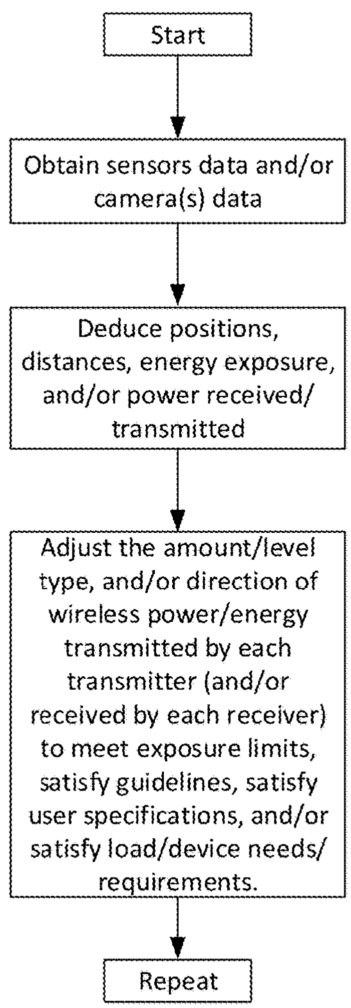
FIG. 10 illustrates an exemplary claimed system and controller operation flowchart.
Figure 11:
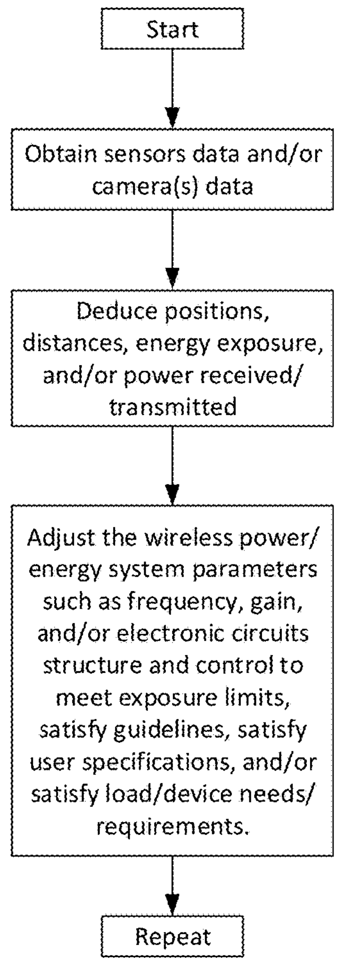
FIG. 11 illustrates an exemplary claimed system and controller operation flowchart.
Figure 12:
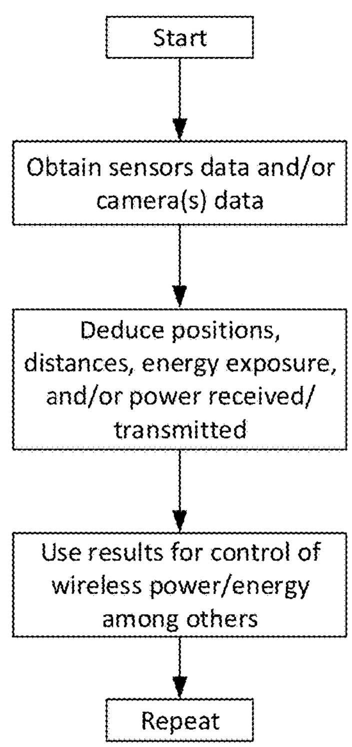
FIG. 12 illustrates an exemplary claimed system and controller operation flowchart.

FIG. 7 claims a cell phone case/enclosure (similarly a tablet case, a computer case . . . etc.) with one or several embedded antennas and/or wireless power/energy receiver/transmitter elements (e.gs. Radio frequency, inductive, resonance inductive, sound/ultrasound, and light/laser, among others) for energy receiving (could also be for transmitting/sending). The antennas (or wireless power/energy receivers/transmitter elements in general) could be molded inside the case material such as inside plastic such that user might not feel its touch (part a). Each antenna could have different radiation or energy receiving/transmission pattern. In another embodiment the outer edges of the case can have coil(s) for additional power/energy receiving (part b). Other coil can be placed to receive (or send) energy from another direction. The different power/energy forms received are combined using an electronic circuit (part c) and used to power the device or is stored a battery or other storage device such as capacitor or super/ultra capacitor.

In one exemplary embodiment, the device case and/or enclosure includes one or more sensors to measure and report energy exposure for health guidelines reasons and/or for controlling energy/power transmitted by one or more transmitters and/or energy received by one or more receivers.

FIGS. 8, 9, 10, 11, and 12 shows general system and controller operation flowcharts to further partially describe some of the claimed systems and controllers discussed and claimed in this document.

Figure 13:
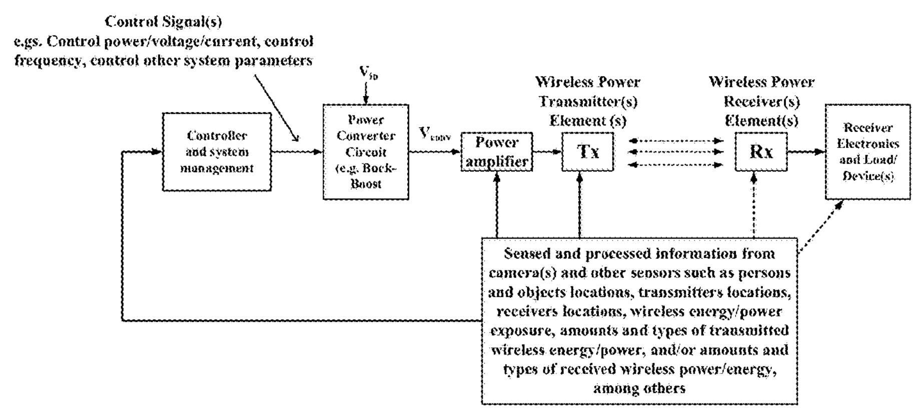
FIG. 13 illustrates a claimed exemplary electric/electronic circuits and system block diagram for adjusting the wireless power amount and type and other system parameters.

FIG. 13 shows a claimed exemplary electric/electronic circuits and system block diagram for adjusting the wireless power amount and type and other system parameters using the cameras and other data obtained as discussed earlier in FIGS. 1 through 12 and described throughout this document. Other electric/electronic circuits and systems designs and block diagrams are possible. In a claimed exemplary control action/command, the supply voltage and/or current of power amplifier or the circuit that drives the wireless power/energy transmitter(s)'s element(s) is varied by controlling the power converter (e.g. buck-boost power converter) that supplies the voltage/current/power to the power amplifier or drive circuit. In another claimed exemplary control action/command, the control parameters and/or circuit configuration of the power amplifier (or power drive circuit), the wireless power/energy transmitter(s) element(s), and/or the wireless power/energy receiver(s) element(s) and/or circuits are adjusted or reconfigured in order to realize the system and control configurations and methods presented in FIGS. 1 through 12 and described throughout this document. It is claimed that the sensing and control can be done either through wired connections, wireless connections, and/or mechanical connections, among other type of connections.

An example sensing and mapping devices which can be used with the disclosed wireless power and energy systems and controllers is Microsoft Kinect or similar device/equipment. Such device/equipment can map the information of the surroundings. Another example is a Lidar system or similar. If the system is installed in several rooms/areas, sensed or mapped information can be shared to realize a multi room or multi area wireless power or energy system with the operation and characteristics as described earlier.

The invention claimed is:

1. A system which transmits and receives wireless power or energy, comprising:

one or more wireless power/energy transmitters equipped with a set of elements and subsystems that transmits one or more wireless power types and forms;

one or more wireless power/energy receivers equipped with a set of elements and subsystems that is able to receive one or more wireless power types and forms;

one or more sensors and controllers that map surrounding objects and type or nature that are able to adjust system parameters and status in order to maintain health and safety requirements while delivering wireless energy.

2. The system of claim 1, wherein the one or more types of wireless power or energy are radiative electromagnetic energy, non-radiative electromagnetic energy, sound waves energy, ultrasound energy, light energy, radio frequency energy, thermal energy and/or inductively coupled energy.

3. The system of claim 1, wherein the sensors and controllers detect the relative positions of the transmitters, receivers, and surrounding objects and/or are able to identify the type and nature of the surrounding objects and accordingly adjust the type and amount of wireless power or energy being transmitted and received.

4. The system of claim 1, wherein the controller select which type(s) of wireless power to transmit and/or receive by each transmitter and/or receiver and the amount and direction of wireless power and energy to transmit and/or receive for each type of wireless power and energy in order to satisfy safety and health requirements while efficiently transferring energy.

5. The system of claim 1, wherein the system and its controller might transmit higher amount of wireless power or energy when there are no human beings or animals in the surroundings and might transmit lower amount of wireless power or energy when there are human beings or animals in the surroundings.

6. The system of claim 1, wherein the system and its controller might adjust the type and direction of the transmitted and received wireless power or energy based on the existence or no existence of human beings or animals in the surroundings or their relative position around the system.

7. The system of claim 1, wherein one or more sensors for mapping the type and relative position of the surrounding objects and transmitters and receivers can be imaging systems with signal processing such as still or video cameras, thermal imaging cameras, Microsoft Kinect system or a similar system, Lidar system or a similar, and/or pyroelectric sensor in order to obtain information to adjust the type and amount of wireless energy for maintain health and safety.

8. The system of claim 1, wherein the controllers, transmitters, and receivers might communicate information between them such as amount of power or energy, location, relative position, temperature, sound, sound direction, sound strength, date, time, and status.

9. The system of claim 1, wherein the system generates one or more form of warnings and actions when the energy exposures or amounts have crossed defined thresholds on sensors or mapping devices measurements.

10. The system of claim 1, wherein the receiver which is able to receive one or more wireless power or energy types and forms within the requirements of health and safety is integrated inside one or more mobile or stationary device, case, object, or battery.

11. The system of claim 1, wherein the operation involves charging one or more batteries during wireless energy receiving mode and discharging one or more batteries during wireless energy transmitting mode with one or more type and amount of wireless energy based on the mapping information of type and relative position of the batteries, devices that contain the batteries, and the surrounding objects of these batteries or the devices that contain the batteries.

12. A wireless power or energy controller for controlling wireless power or energy type, direction and amount, comprising:

one or more sensor units to map the location and type of one or more wireless power or energy receivers, one or more wireless power or energy transmitters, and one or more surrounding objects;

one or more control signals to control what types of wireless power or energy being transmitted or received;

one or more control signals to control the amount of wireless power or energy being transmitted or received.

13. The controller of claim 12, wherein the sensor unit uses video or still image, thermal data, sound data, and/or radar data for mapping the type and relative position of the surrounding objects of transmitters and receivers in order to obtain information to adjust the type and amount of wireless energy for maintain health and safety.

14. The controller of claim 12, wherein the control signals commands one or more wireless power or energy transmitter and/or one or more wireless power or energy receiver in order to adjust the type and amount of wireless energy for delivery wireless energy while maintaining health and safety requirements.

15. The controller of claim 12, wherein the control signals commands the amount and type of wireless power or energy transmitted or received based on the mapped location and type of surrounding objects, transmitters, and receivers.

16. The controller of claim 12, wherein the control signals commands the type and amount of wireless power or energy transmitted or received based on the mapped location and type of the objects, transmitters, and receivers in other locations which are or are not a surrounding location.

17. A wireless power transfer system with an arrangement in a space, comprising:

two or more stations that can each be configured to transmit or receive wireless power or energy;

one or more surroundings' mapping device;

one or more controller.

18. The system of claim 17, wherein the controller determines which station(s) transmit wireless power or energy and the amount and type of power or energy based on the surrounding objects and their nature and the receiving devices.

19. The system of claim 17, wherein the controller determines which station(s) receive and retransmit wireless power or energy and the amount and type of power or energy based on the surrounding objects and their nature and the receiving devices.

20. The system of claim 17, wherein the controller determines the transmitting and receiving path(s) by controlling the stations in order to optimize the delivery of wireless power or energy to the devices being powered and/or in order to satisfy health and safety requirements.

* * * * *